(12) United States Patent
Reuel et al.

(10) Patent No.: US 7,341,222 B1
(45) Date of Patent: Mar. 11, 2008

(54) MICRO-UNMANNED AERODYNAMIC VEHICLE

(75) Inventors: Nigel Reuel, Rio Rancho, NM (US); Troy A. Lionberger, Ann Arbor, MI (US); Paul C. Galambos, Albuquerque, NM (US); Murat Okandan, Albuquerque, NM (US); Michael S. Baker, Albuquerque, NM (US)

(73) Assignee: The United States of America as represented by the United States Department of Energy, Washington, DC (US)

( * ) Notice: Subject to any disclaimer, the term of this patent is extended or adjusted under 35 U.S.C. 154(b) by 330 days.

(21) Appl. No.: 11/100,592

(22) Filed: Apr. 7, 2005

(51) Int. Cl.
*B64C 33/00* (2006.01)

(52) U.S. Cl. ............... 244/11; 244/22; 446/35

(58) Field of Classification Search ................ 244/11, 244/22, 72, 99.2, 99.3, 99.11, 99.8, 13; 446/35
See application file for complete search history.

(56) References Cited

U.S. PATENT DOCUMENTS

| | | | |
|---|---|---|---|
| 6,082,671 A | | 7/2000 | Michelson |
| 6,769,949 B2 * | 8/2004 | Kim et al. ..................... 446/35 |
| 6,824,094 B2 * | 11/2004 | Richard ........................ 244/11 |
| 6,840,477 B2 * | 1/2005 | Hamamoto et al. ........... 244/22 |
| 6,938,853 B2 * | 9/2005 | Pines et al. ................... 244/11 |
| 6,975,193 B2 * | 12/2005 | Knieser et al. ............... 335/78 |
| 7,036,769 B2 * | 5/2006 | Wood .......................... 244/11 |
| 7,107,842 B2 * | 9/2006 | Wu et al. ................. 73/504.15 |
| 2003/0218102 A1 * | 11/2003 | Van Dam et al. ........... 244/215 |
| 2006/0027703 A1 * | 2/2006 | Bussom et al. .......... 244/17.13 |
| 2006/0055281 A1 * | 3/2006 | Yassini ....................... 310/309 |
| 2006/0266884 A1 * | 11/2006 | Perlman .................... 244/99.8 |

\* cited by examiner

*Primary Examiner*—Michael J. Carone
*Assistant Examiner*—Benjamin P Lee
(74) *Attorney, Agent, or Firm*—James C. Durkis; Paul A. Gottlieb (57) ABSTRACT

A MEMS-based micro-unmanned vehicle includes at least a pair of wings having leading wing beams and trailing wing beams, at least two actuators, a leading actuator beam coupled to the leading wing beams, a trailing actuator beam coupled to the trailing wing beams, a vehicle body having a plurality of fulcrums pivotally securing the leading wing beams, the trailing wing beams, the leading actuator beam and the trailing actuator beam and having at least one anisotropically etched recess to accommodate a lever-fulcrum motion of the coupled beams, and a power source.

14 Claims, 8 Drawing Sheets

MICRO-UNMANNED AERODYNAMIC VEHICLE

The United States Government has rights in this invention pursuant to Contract No. DE-AC04-94AL 85000, between the United States Department of Energy and the Lockheed Martin Corporation for the operation of the Sandia National Laboratory.

BACKGROUND OF THE INVENTION

1. Field of the Invention

The present invention relates generally to flying devices. Particularly, the present invention relates to unmanned aerodynamic vehicles (UAV). More particularly, the present invention relates to micro-unmanned aerodynamic vehicles.

2. Description of the Prior Art

Existing unmanned aerial vehicles (UAVs) have been successfully tested and utilized for outdoor aerial reconnaissance missions. Experiments have shown on numerous occasions, including operations such as Desert Storm, that UAVs often go unnoticed when flying at several thousand feet over their targets. The state of the art in optics is such that high resolution video and infrared images can be gathered unobtrusively from existing platforms.

There is a similar need for UAVs that are capable of performing close environment reconnaissance such as, for example, indoor reconnaissance missions. The requirements for a UAV to successfully perform close environment reconnaissance may include such capabilities as rapidly negotiating hallways, crawling under doors, or navigating ventilation systems in an attempt to quickly penetrate deep into a building to complete the mission. Meso-scale aerodynamic vehicles (MAV) have been proposed to fulfill such mission requirements. MAVs are generally thought of as miniature flying machines having no dimension greater than approximately 15 cm.

There is a huge difference between the world of macroscale and microscale aerodynamics. Macroscale aerodynamics, referred to as quasi-steady state aerodynamics (i.e. fixed wing airfoil), predominately depends on inertial forces to stay aloft. At the microscale, insects and other small airborne creatures, fly on an unsteady viscous sea of their own creation. They intentionally induce complex wakes and vortices in order to stay airborne. This complex form of flight is known as unsteady state aerodynamics and is exhibited in all flapping flight. Using Reynolds Numbers (a unitless number which signifies the extent of inertial forces to viscous forces), it can be quantitatively determined when steady state aerodynamics become obsolete and when flapping flight is necessary. Large airplanes range in the millions of Rey while insects range in the thousands of Rey or lower.

There have been several MAVs developed in the past. One such MAV was developed at UC Berkley. The UC Berkley MAV was a small electrically powered meso-scale-flapping device. The UC Berkley MAV included a 1.3 cm large "thorax" which translates the small linear displacement of two piezoelectric actuators into full, three-dimensional, flapping motions via a complex "four-bar" transmission system.

U.S. Pat. No. 6,082,671 (2000, Michelson) discloses an apparatus and method for multimodal electrochemical insect known as an entomopter. The entomopter is a species of a MAV. The entomopter mimics the flight characteristics of an insect by flapping wings to generate lift. The entomopter's wings are powered by a reciprocating power source. The Michelson device accomplishes the three-dimensional, flapping motion by way of a complex transmission system that incorporates a plurality of bellows that are pressurized and vented and other linkage or springs and pistons, or linkage structure with reciprocating actuator, etc.

The prior art MAVs are not true microscale vehicles but mesoscale vehicles. This is so because the prior art MAVs have fuselages (i.e. thorax) in the centimeter size range.

Therefore, what is needed is a micro-unmanned aerodynamic vehicle flapping device (μ-UAV) with full-flapping functionality (i.e. translational and rotational motion) from two-dimensional linear displacement without the use of a complex transmission system. What is also needed is a μ-UAV that is about ten times smaller than the smallest flapping vehicles currently available. What is further needed is a μ-UAV that uses MEMS-based (micro electro-mechanical system) technology. What is still further needed is a μ-UAV that requires virtually no assembly since, as scale decreases in a meso-scale device, assembly becomes more and more difficult.

SUMMARY OF THE INVENTION

It is an object of the present invention to provide a μ-UAV with full-flapping functionality from two-dimensional linear displacement without using a complex transmission system. It is another object of the present invention to provide a μ-UAV that is radically smaller than any existing electrically powered flapping device. It is a further object of the present invention to provide a MEMS-based μ-UAV. It is yet another object of the present invention to provide a MEMS-based μ-UAV that requires virtually no assembly.

The present invention achieves these and other objectives by providing a MEMS-based μ-UAV that functions to convert the predominately linear translation of MEMS technology, specifically thermal or electrostatic actuators, into full-fledged, adjustable, three-dimensional, flapping-flight motions. With a Rey of sub 1000, the MEMS-based μ-UAV will operate in the realm of unsteady state aerodynamics. The design also functions for ready application in the experimental field (i.e. quantitative measurement), having the capability to measure force, power, and lift in an artificial flying insect.

The μ-UAV of the present invention has three main components: (1) leading wing and trailing wing actuators, (2) wings, and (3) one or more flexible connections/compliant mechanisms. One of the novel features of the μ-UAV of the present invention is using the two actuators to induce translational and rotational movement simultaneously. This is achieved by attaching one actuator to the wing's leading spar and another to the wing's trailing spar. Setting the two actuators out of phase induces complex flight motions.

The fabrication of μ-UAV of the present invention is complex. Everything up through the layer of the actuator spar "step" is constructed using silicon surface machining (SUMMiT™) in one embodiment of the invention. Then, all over the device a thin layer of Parylene C will be deposited in those cases where a Parylene C wing is fabricated. A quick etch is preformed to "cut" the wings from the rest of the Parylene C. Finally, the whole module will be dipped in HF, the sacrificial $SiO_2$ will wash away, and the device will be ready for testing.

One of the novelties of this design is that with one fabricated device there is a multitude of unique flight patterns possible. By sending a distinct electrical signal from a computer to the device, a new pattern is obtainable. This is done in two ways. The first way is to change the strength of the actuator, dependent on time. This will produce unique flight patterns such as constant velocity, high acceleration, or highest velocity at the midpoint. The second way to produce new flight patterns is to manipulate the phase difference. Phase difference can be thought of as the time it takes for the back actuator to catch up to the front actuator. Phase difference also denotes the extent of translational or rotational motion.

To prove the μ-UAV of the present invention would work prior to building actual prototypes, computational fluid dynamic simulations were performed. Simulations were performed using Computational Fluid Dynamics Research Corporation software simulating the simultaneous translation and rotation of a rectangular airfoil 100 μm wide and 1 μm thick. The two-dimensional simulation included a total upward translation distance of 30 μm and a total rotation of 15 degrees counterclockwise, ultimately reversing motion upon reaching the upward limit of translation and returning to the initial position. The wing stroke frequency was set to 384.5 Hz, allowing for a complete stroke to be completed in 2.6 milliseconds. These values were arbitrarily selected for simplicity and are confidently within the performance capabilities of the μ-UAV of the present invention.

The description of the translation and rotation were sinusoidal in nature and exactly 90 degrees out of phase. This allows for rotation to dominate the motion at the top and bottom of the vertical motion and for translation to dominate at the midpoint. The 90 degree out-of-phase motion is just one of many patterns that will be possible with the design. The flowfield generated as a result of the sinusoidal wing motion demonstrated the presence and effects of wake capture. As the wing began to rotate in either direction, a vortex was created on the side of the wing it was rotating towards, reducing pressure on the side facing the vortex. The actual design will have wings 2.5 times wider than those used in the simulation and the actual device is expected to exceed simulation predictions by a factor of about 10.

It should be noted that the vertical flapping method employed in these simulations is ultimately the least preferred flapping method since the majority of the net lift is lost on the upstroke. The method was used in this case for simplicity of design and to overcome fabrication and design issues inherent to such a complex device. A much more efficient method of employing horizontal instead of vertical wing motion is preferred because it significantly increases the net lift since there does not exist a segment of the wing stroke that produces negative lift.

As the size-scale of the μ-UAV of the present invention decreases, the dependency of lift generation due to wing motion becomes less important. There exists a limit at which the gravitational forces acting downwards will more likely be opposed by drag forces acting on the device by ambient air currents than by aerodynamic lift. When this limit is reached, the wings of the μ-UAV of the present invention will act more like directional "micro-thrusters" responsible for controlling in-plane motion (forward, backward, and in-plane rotation) in order to find air currents capable of sustaining lift and moving it towards the desired target. In-plane motion is easily within the capabilities of the current and future μ-UAV designs since the wing stroke includes wing rotation. As a result, forward and backward motion can be achieved by preferentially rotating the wings in a single direction on either the upstroke or the downstroke and in-plane rotation can occur by actuating one wing of the device faster than the other. This method of flight is quite similar to macroscale, unpowered, fixed-wing aircraft that depend on locating and exploiting the upward motion of thermal air currents in the atmosphere.

The μ-UAV can be fabricated using either the SUMMiT V™ or the SwIFT processes or other MEMS fabrication techniques or processes, with only minor design modifications. The μ-UAV can be configured to be thermally actuated and suspended by fixed-fixed cantilever interconnects, or electrostatically actuated and suspended by free-ended cantilever interconnects. Wings can be made of polysilicon or parylene or other materials common to semi-conductor or plastics micro-fabrication.

Out-of-Plane Displacement Amplification:

A major design issue concerning the μ-UAV is the out-of-plane motion of the wings necessary for the vertical flapping method of lift generation. In terms of traditional Micro Electro-mechanical Systems (MEMS), achieving out-of-plane displacement greater than the total layer thickness of the alternating polysilicon/silicon dioxide stack requires unique design components. One common method for repeatedly actuating in this manner is to use in-plane actuation to "buckle" a hinged structure, forcing the structure to bend and rise out-of-plane. While hinged structures have been successfully used in the past, inherent reliability issues surrounding the many moving parts required for this method suggest a need for an alternate approach. It was therefore devised that the limited out-of-plane motion capable of being attained using traditional MEMS can be amplified using a lever-fulcrum system scaled appropriately.

By employing a trade-off between force and displacement, as is required in such a system, a high-force actuator with low-displacement can generate a low-force, high-displacement actuation at the wingtip. This is limited only by the force necessary to overcome the drag force resulting from the motion of the wings. Thus, the force/displacement tradeoff of a specific design can be tailored to achieve the wing velocities necessary to produce lift required for a specific payload.

Actuator Design:

The actuators used in the μ-UAV of the present invention are either electrostatic plate actuators or thermal actuators. However, other actuator methods can be used. Thermal actuators require large amounts of current (which will likely not be compatible with an on-board power system at this scale) but are extremely resilient, and therefore were included to increase the likelihood of having working, testable devices should the capacitive actuators fail to operate properly. The only two functional differences between the two types of actuators used are that the thermal actuators actuate out-of-plane and must actuate both wings simultaneously while the capacitive actuators actuate towards the substrate and can operate each wing independently.

In both cases, however, the lever-fulcrum method is employed to amplify the vertical displacement of the actuators by an appropriate factor so as to generate the desired wingtip displacement of between about 50 and about 100 microns. Of course, the bending of the lever beams and the velocity-dependent drag force will naturally introduce a lag in the response of the wing motion that will limit performance. Though at this point, the effects of these factors are only roughly approximated in the initial design. Should these two variables appear to dominate, however, a more detailed analysis will be performed to optimize the design. These factors should only limit the maximum velocity of the wingtips while having no effect on the range of the motion at lower velocities.

Pivot Design:

A unique issue was encountered when designing the hinge points for the lever-fulcrum system. Within the context of traditional surface micromachining, the downward displacement of a lever is physically limited by either the substrate or a layer covering the substrate. For fabrication using the SUMMiT V™ process, this translates into a maximum downward displacement of approximately 6 µm when using the fourth polysilicon layer as the lever and the third and fifth layers as "staple" enclosures. While this may ultimately prove useful for out-of-plane motion in other, more traditional MEMS applications, it is insufficient for the purposes of the present invention since overall displacements are required to be on the order of about 50 to about 100 microns.

To overcome this limitation, the µ-UAV of the present invention includes through-wafer, backside anisotropic etches that will create "pits" to give adequate clearance for the lever motion. This unique feature of the design gives designers near complete freedom to define the displacement amplification ratio as needed, without being constrained by the clearance issues inherent with surface micromachining. The µ-UAV of the present invention actually uses a two-lever system to achieve the final desired wingtip displacement, each of which is capable of multiplying the displacement by an amount equal to the ratio between the pivot point and the ends of the lever.

For example, in the case of the electrostatic actuators, the freely suspended, charged plate is allowed to snap down to the nitride layer covering the substrate, forcing one end of a lever downwards, hinging the entire beam about a pivot point, and raising the opposite end out-of-plane. This end is then connected to a wing spar, which consequently rises out-of-plane, hinging the spar about a second pivot point and forcing the wing downwards. Both components of the lever-fulcrum system are capable of separately amplifying the motion of the wingtips.

It should be noted that a similar two-lever method is used in the case of thermal actuators. Since the thermal actuator displaces out of plane, the directions of motion for each component are reversed. This ultimately causes the wing to displace upwards instead of downwards.

The final use of the lever-fulcrum system is used to rotate the wings. Essentially, each wing is connected to two wing spars that flank the midpoint of the wing's end. The distance from the midpoint is responsible for the amplification of the wing rotation that results from a difference in height between the two spars. For example, if the spars are each 10 µm from the midpoint of the end of the wing, and the wing is 250 µm wide, then a difference in height of 1 µm between the wing spars will result in a displacement of each edge of the wing of approximately 12 µm, one upwards and the other downwards. In this way, the rotation that occurs as a result of a 1 µm change in height of each wing spar is now amplified 24 times. This method is used in the µ-UAV of the present invention to generate significant wing rotation. This method is limited only by the ability to create a change in height between the wing spars and the ratio of the wing width to the distance each spar is from the midpoint.

Wing Design:

Two different wing materials were selected for use in the final µ-UAV embodiments of the present invention, although many other materials may be used that are common to semi-conductor and plastics micro-fabrication. Two of the four devices (one driven by electrostatic actuators and the other by thermal actuators) included were designed with wings made of solid polysilicon. The rationale behind including wings made of such high-density material is twofold. First, the overall volume of each wing is so small that macroscale issues such as inertia and gravitational forces are generally negligible at this scale. Second, as with the decision to include thermal actuators in case the electrostatic actuators fail, it was thought appropriate to include devices that would still operate properly should the parylene deposition and/or patterning steps fail. The remaining two devices included were designed with wings consisting of polysilicon beams that are used to anchor the perimeter of a parylene membrane, forming the wing surface. The parylene deposited on the device driven by thermal actuators is only anchored along three of the four sides of the perimeter, allowing force measurements to be made for a flapping wing of elastic material with a trailing edge free to move in response to the flow. This is similar to a bat's wing. This design was included to provide insight into an alternate approach to generating lift.

On-Board Power Generation:

Several methods have been considered to provide adequate power to a µ-UAV system. Due to the small dimensions of the device, conventional power supplies are not compatible with the autonomous nature of the µ-UAV, and thus more creative methods must be employed. One method is to use radio frequency (RF) signals to power and/or control the device. Using RF signals would essentially allow for complete control of motion, directed by an agent from a remote location. The equipment required to be integrated into the µ-UAV platform will, however, demand more complex structures and circuitry than is capable of being created using the current batch fabrication method. The most ideal version of on-board power generation involves employing a method of scavenging power from the environment. Such options include solar, chemical and vibration energy that is continually collected, transformed into electrical current and used by on-board electrical devices. The µ-UAV can also be powered by photovoltaics using FET or a similar approach. The use of photovoltaic cells currently stands as the most compatible source for the moderate voltage, low current demands of a µ-UAV driven by capacitive actuators.

Autonomous Control and Design-Dependent Function:

Control of the motion of each µ-UAV will be closely tied to power generation. That is, the motion can be controlled be selectively targeting actuators on one side of the device to actuate a greater distance. In doing so, the wing motion pattern can be manipulated to drive the µ-UAV in a specified direction to accomplish a task. Though future designs may include a method of control using RF signals, the first truly autonomous device will be designed specifically to perform simple tasks, such as search and report functions.

For example, using photovoltaic sources as power supplies, control of the µ-UAV can be achieved by including photocollectors into the design and allowing simple gradient searches to be performed to locate a source of light. To report information, light-emitting diodes (LED's) may be integrated into the design to emit a specific frequency of flashes corresponding to the distance from the target. In this manner, swarms of µ-UAVs may be capable of swarming towards a target, reporting information back to the point of origin. Alternative, early-generation devices will also focus on the capability of following and swarming about a chemical signal. In addition, less noticeable reporting methods might be explored, such as radar detection of the location of each µ-UAV.

Swarms:

In order to localize a source such as radiation, chemical etc., a swarm of mobile flying microsensors can be utilized. Individual µ-UAVs will be powered with photovoltaic sources, possibly storing some of the energy on board for extended operation. These µ-UAVs mimic insect flight and behavior. A collection of the µ-UAVs can be made to localize on a source through a simple gradient search technique. Individual μ-UAVs can be localized/located in several ways. With radar, it is possible to get a map of each element in a given space. By using an on board laser/LED to emit coded pulses, information on element identification, power level, and chemical specifications can be relayed back.

Another critical feature is the selective activation/deactivation of the μ-UAVs. This is accomplished by using wavelength sensitive detectors and circuitry. This function can be realized by using temporally coded light flashes at different wavelengths. It is also possible to link the μ-UAVs with RF but that makes the structures larger and circuitry more complex. Fabrication of these structures will entail the use of SOI substrate. The device layer will serve as both mechanical and electronic substrate. Some of the wing elements and compliant structures will be in the device layer. Detectors and electronics will also be in the same layer of silicon. Bosch etching will define and separate structures from the substrate.

Parylene C is used as wing material and insulation before the release step. In case of bonded laser/LED or other components, Parylene C deposition after the bonding step will protect the bonded structures and wire bonds as well. Another possibility is inter-element communication to coordinate swarm behavior. The LED's or lasers on board can be made specific for communicating with other (one or many) swarm members. The substrate can have a very low doping density and serve as a large photocollector sensor. Depending on the circuitry used, the μ-UAVs can also be modified to track radiation sources.

Using these methods for control and detection, the swarm will be capable of finding the release point of a toxic chemical or, as a much more advanced function, tracing the path of a missing person based on smell. The integration of chemical sensors, however, is a highly advanced function that will be deferred to future designs.

Alternative Wing Actuation and Drive Mechanism:

There exists in nature a much more efficient method for generating lift than the vertical flapping method. Fruit flies, for example, employ a horizontal flapping method in which the wing translates at an angle so as to deflect fluid downwards, then rotates about the wing's midpoint, and reverses direction until returning to the point of origin, again deflecting fluid downwards. In this way, there is no segment of the wing motion that produces negative lift. This horizontal motion is much more efficient at producing lift than the vertical flapping method, which relies on the difference in the cross-sectional area exposed to the oncoming flow to produce less negative lift on the upstroke than positive lift on the downstroke. With the likely integration of highly sensitive micro-scale sensors, the platform has the potential to replace even the most sensitive, conventional sensors. Further, the autonomous operation of such sensors will tremendously increase the efficiency, speed and precision of any field requiring the ability to remotely locate a target or series of targets. Such relevant fields include: search and rescue, environmental monitoring, forensic investigations, homeland security, clandestine services and unmanned warfare.

DETAILED DESCRIPTION OF THE PREFERRED EMBODIMENT

The preferred embodiment(s) of the present invention is illustrated in FIGS. 1-9. It should be understood that the relative size of the illustrated components in the Figures are not proportional to each other but are illustrated in such a way to provide to one of ordinary skill in the art a clear understanding of the structural relationships of the various components of the present invention. The present invention employs four unique designs that include (1) wing actuation methods using pivoting levers to amplify out-of-plane wing displacement, (2) the batch-fabricated nature of MEMS-based micro-unmanned aerodynamic vehicle (μ-UAV) designs without post-process assembly requirements, (3) the unique functionality of the two-dimensional device to produce complex, three-dimensional wing stroke patterns, and (4) the size scale of a completed μ-UAV system. Total wingspan is approximately 2.5 mm, which is on the order of 10 times smaller than the smallest flapping vehicle previously made.

A micro-unmanned aerodynamic vehicle of the present invention includes an actuator component, a plurality of wings, a flexible connection, and a substrate. The actuator component may be either a thermal actuator or an electrostatic plate actuator. The following description of the preferred embodiments will begin with a disclosure of the preferred structure using vertical wing movement when thermal actuators are employed in the micro-unmanned aerodynamic vehicle and then the preferred structure when electrostatic actuators are employed. An additional embodiment will also be discussed where the wing movement involves horizontal movement.

Figure 1:
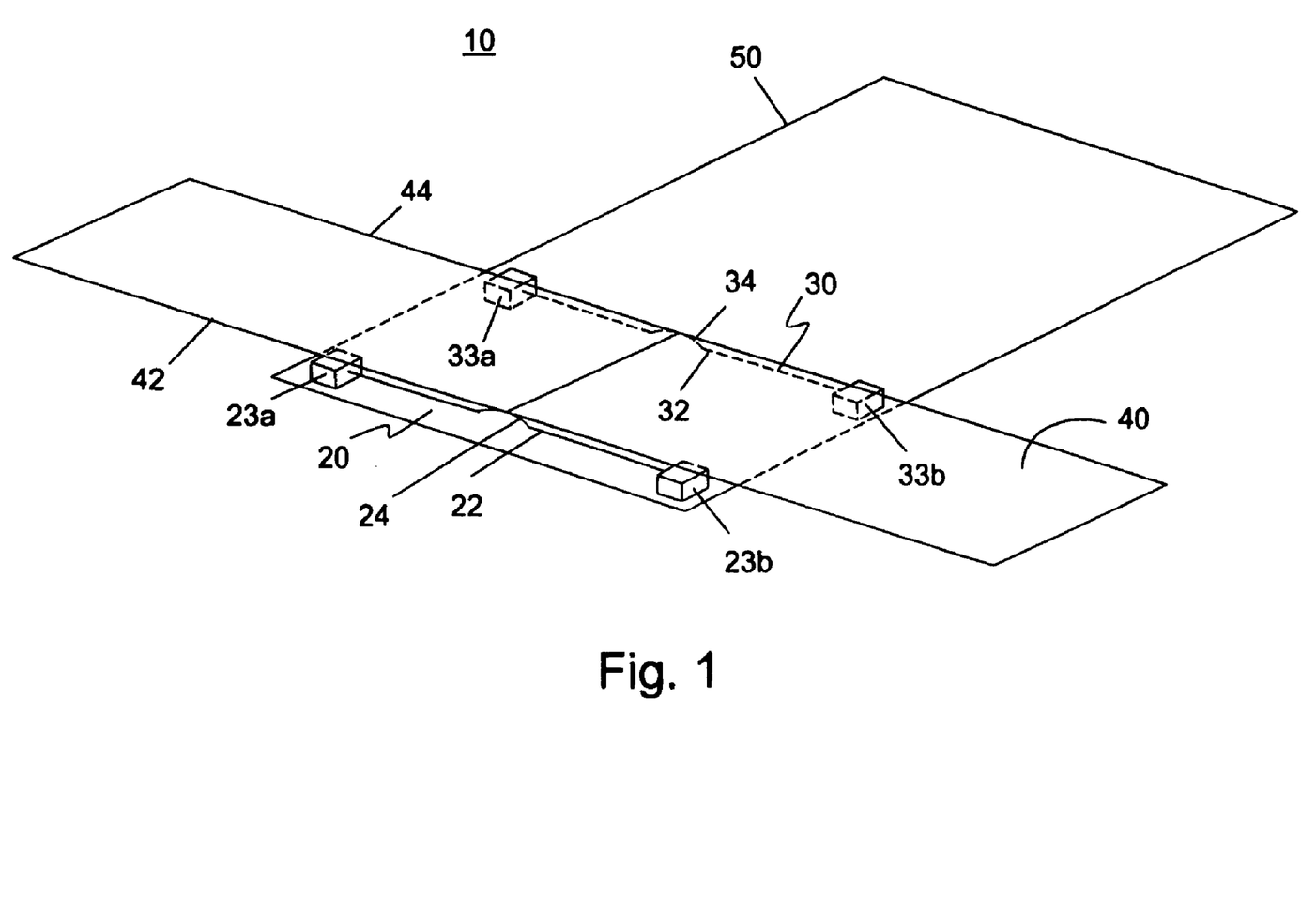
FIG. 1 is a perspective, graphic representative view of a simplified embodiment of a μ-UAV of the present invention.

In terms of traditional MEMS, achieving out-of-plane displacement greater than the total layer thickness of alternating polysilicon/silicon dioxide stack requires unique design components. As illustrated in FIG. 1, one common method for repeatedly actuating in this manner is to use in-plane actuation to "buckle" a hinged structure 10, forcing the structure to bend and rise out-of-plane. Hinged structure 10 employs two thermal actuators 20 and 30, a hinged wing 40, and a substrate 50. Each actuator 20 and 30 is made up of one polycrystalline silicon leg 22 and 32 approximately 600 microns in length between actuator ends 23a and 23b, 33a and 33b, respectively. Actuators 20 and 30 are fabricated with existing silicon-surface machining technology (for example, SUMMiT™).

Figure 2:
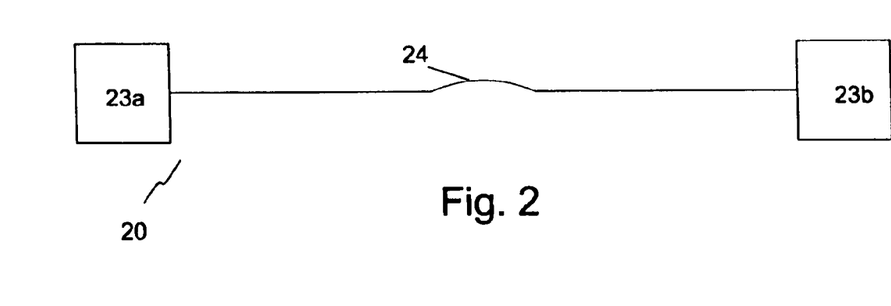
FIG. 2 is a cross-sectional view of a thermal actuator used in one embodiment of a μ-UAV of the present invention.
Figure 3A:
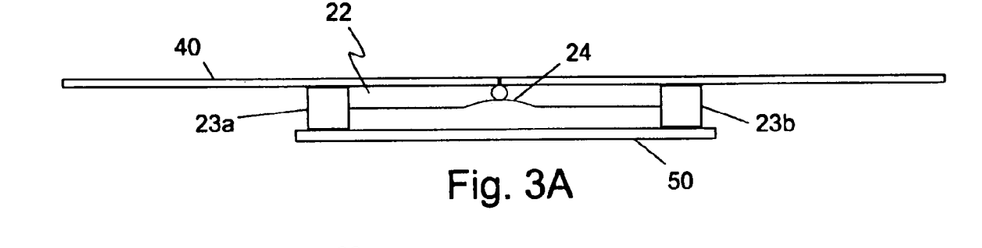
FIGS. 3A and 3B are cross-sectional views of a thermal actuator illustrating the displacement of a hinged structure such as a wing of a μ-UAV of the present invention.
Figure 3B:
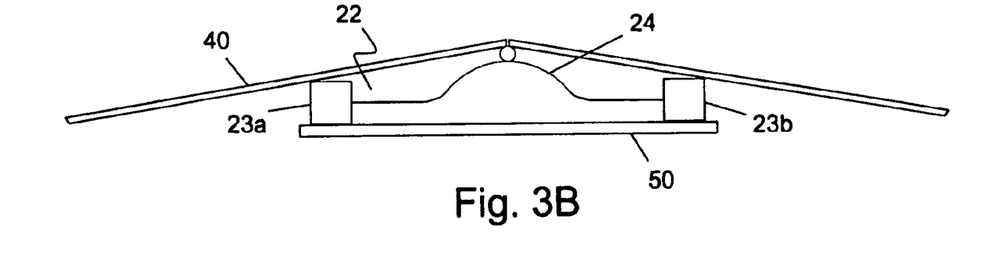

In order to induce a displacement perpendicular to the surface of substrate 50, steps 24 and 34 are fabricated in the center of actuators 20 and 30. FIG. 2 is a cross-sectional illustration of actuator 20. As illustrated in FIGS. 3A and 3B, when a current is run through legs 22 and 32, the polycrystalline silicon acts as a resistor. Legs 22 and 32 then heat up and expand. Because thermal actuators 20 and 30 are anchored at actuator ends 23a and 23b, 33a and 33b, respectively, they will bow in the easiest direction. This is the direction in which steps 24 and 34 are bent. Sufficient current will produce a vertical displacement. Wing 40 is only attached to the center of actuator legs 22 and 32. Thus when oscillated, wing 40 will pivot around actuator ends 23a and 23b, 33a and 33b, respectively. This provides a displacement of about 16 microns perpendicular to the plane of the substrate 50.

One of the novel features of this design is using thermal actuators 20 and 30 to induce translational and rotational movement simultaneously. As shown in FIG. 1, this is obtained by attaching actuator 20 to a wing leading spar 42 and actuator 30 to a wing trailing spar 44. Setting actuators 20 and 30 out of phase induces complex flight motions. Because actuators 20 and 30 oscillate on the principle of high resistance and thermal expansion and because hinged wing 40 was made of a titanium frame, the hinged connection includes a very thin layer of insulating material such as, for example, silicon nitride, between hinged wing 40 and actuators 20 and 30.

It was determined, however, that the vertical, wingtip displacement required to provide sufficient lift had to be about 50 microns and larger. It was further determined that the limited out-of-plane motion capable of being attained using traditional MEMS can be amplified using a lever-fulcrum system. By employing a trade-off between force and displacement, as is required in such a system, a high-force actuator with low-displacement can generate a low-force, high-displacement actuation at the wingtip. This is limited only by the force necessary to overcome the drag force resulting from the motion of the wings. Therefore, the force/displacement tradeoff of a specific design can be tailored to achieve the wing velocities necessary to produce the lift required for a specific payload.

Figure 4:
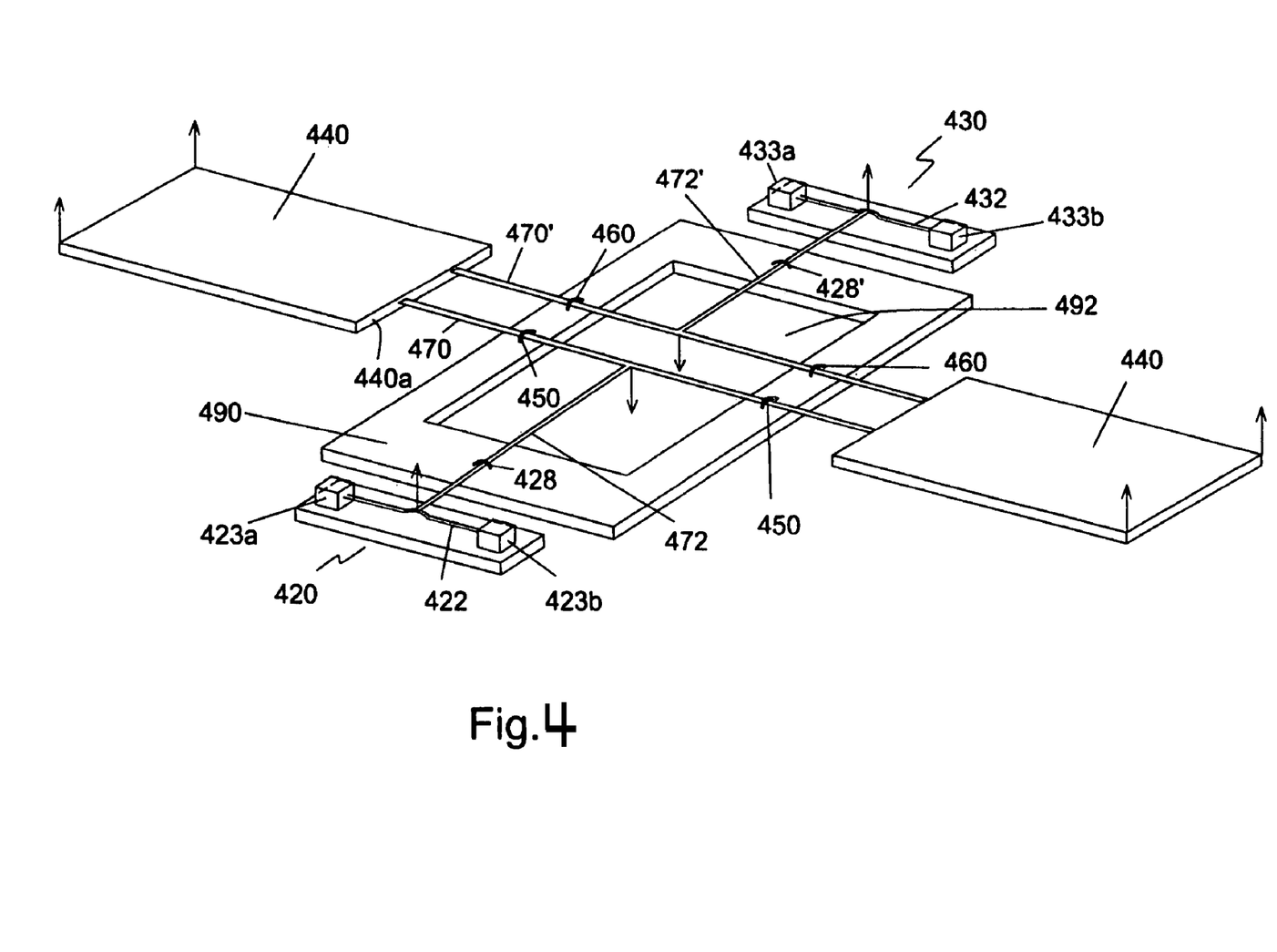
FIG. 4 is a perspective view of one embodiment of a μ-UAV of the present invention showing through-wafer backside anisotropic etches.

FIG. 4 illustrates one embodiment of a micro-unmanned aerodynamic vehicle (μ-UAV) 400 of the present invention using thermal actuators. μ-UAV 400 includes a leading actuator 420, a trailing actuator 430, a leading actuator fulcrum 428, a trailing actuator fulcrum 428', a pair of wings 440, leading wing edge fulcrums 450, trailing wing edge fulcrums 460, leading wing beam 470 and trailing wing beam 470', actuator beams 472 and 472', a substrate 490, and a power source (not shown). In order to attain the vertical displacement required, i.e. 50 to 100 microns, μ-UAV 400 includes through-wafer, backside anisotropic etches that create "pits" (as indicated by ref. no. 492) to give adequate clearance for the lever motion. This unique feature gives designers near complete freedom to define the displacement amplification ratio as needed, without being constrained by the clearance issues inherent with surface micromachining. As discussed above, it should be noted that actuators 420 and 430 are thermal actuators. Because actuators 420 and 430 are thermal actuators, actuators 420 and 430 must actuate both wings 440 simultaneously in the embodiment shown.

Actuators 420 and 430 are each made up of one polycrystalline silicon leg 422 and 432 between actuator ends 423a and 423b, 433a and 433b, respectively. Actuators 420 and 430 are fabricated with existing silicon-surface machining technology (for example, SUMMiT™). As previously disclosed, to obtain the desired wingtip displacement, the lever-fulcrum method is employed to amplify the vertical displacement of the actuators by an appropriate factor so as to generate the desired wingtip displacement of between about 50 and about 100 microns. Each wing 440 is connected to wing beams 470 and 470', each wing beam 470 and 470' flanking the midpoint of the wing's end 440a. The distance from the midpoint is responsible for the amplification of the wing rotation that results from a difference in height between wing beams 470 and 470'.

For example, if wing beams 470 and 470' are each 10 μm from the midpoint of the end of the wing, and the wing is 250 μm wide, then a difference in height of 1 μm between wing beams 470 and 470' will result in a displacement of each edge of the wing of approximately 12 μm, one upwards and the other downwards. In this way, the rotation that occurs as a result of a 1 μm change in height of each wing beam is now amplified 24 times. This method is used in the μ-UAV design to generate significant wing rotation, limited only by the ability to create a change in height between the wing beams 470 and 470' and ratio of the wing width to the distance each wing beam is from the midpoint.

Figure 5:
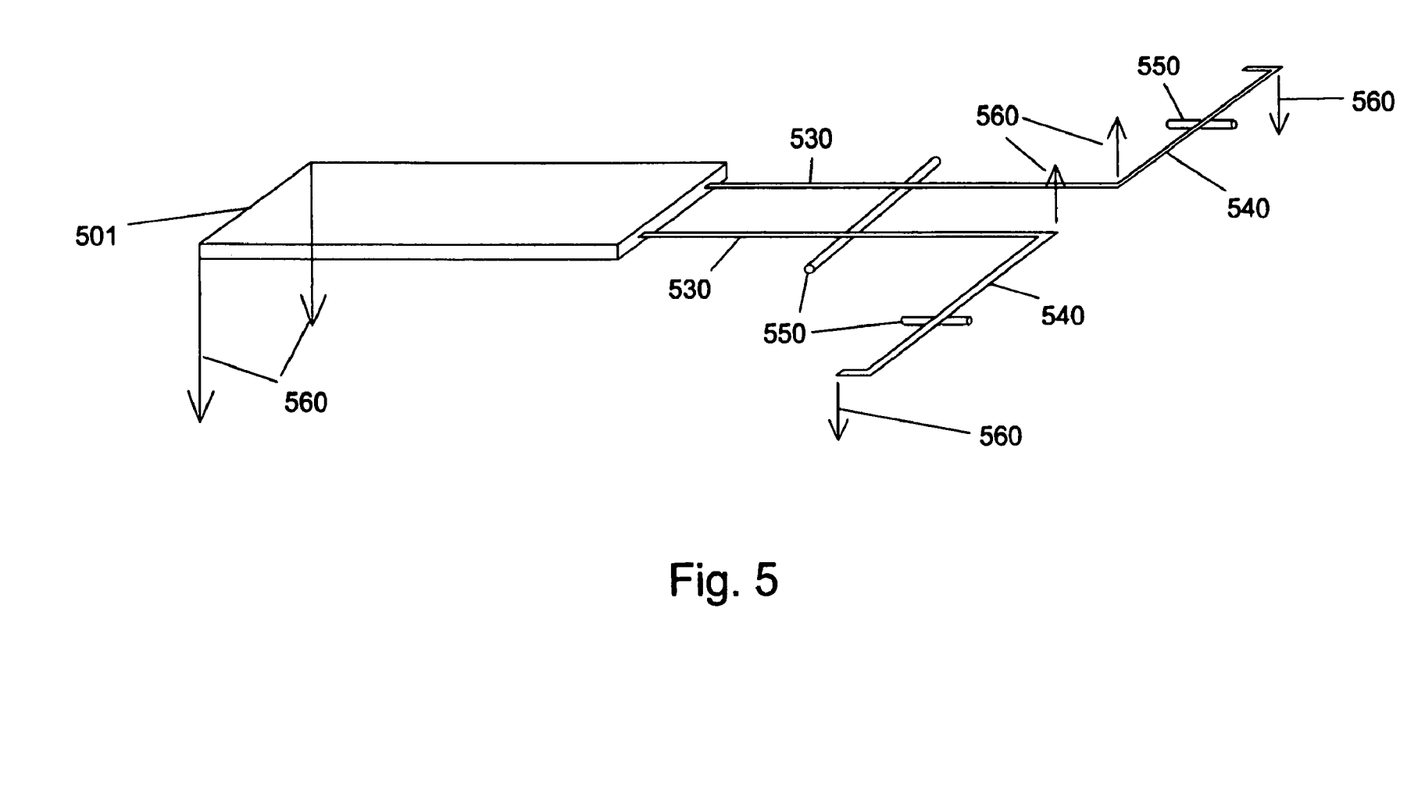
FIG. 5 is a perspective view of a conceptual representation of a method for attaining out-of-plane displacement amplification.

FIG. 5 shows a conceptual representation of a method for attaining out-of-plane displacement amplification at a wingtip 501 of μ-UAV. Each fulcrum 550 is capable of amplifying the displacement of a wing 500 by the ratio of the distances between the ends of wing beams 530 and actuator beams 540 and their respective fulcrums 550. The applied force is inversely proportional to the displacement amplification. Arrows 560 indicate the direction of displacement.

Two different wing materials were selected for use in this embodiment of the μ-UAV design. Two of the four embodiments (one driven by electrostatic actuators and the other by thermal actuators) are designed with wings made of solid polysilicon. The rationale behind including wings made of such high-density material is twofold. First, the overall volume of each wing is so small that macroscale issues such as inertia and gravitational forces are generally negligible at this scale. Second, it was thought appropriate to include devices that would still operate properly should the parylene deposition and/or patterning steps fail.

The remaining two embodiments are designed with wings consisting of polysilicon beams that are used to anchor the perimeter of a Parylene C membrane forming the wing surface. The Parylene C deposited on the device driven by thermal actuators is only anchored along three of the four sides of the wing perimeter.

Figure 6:
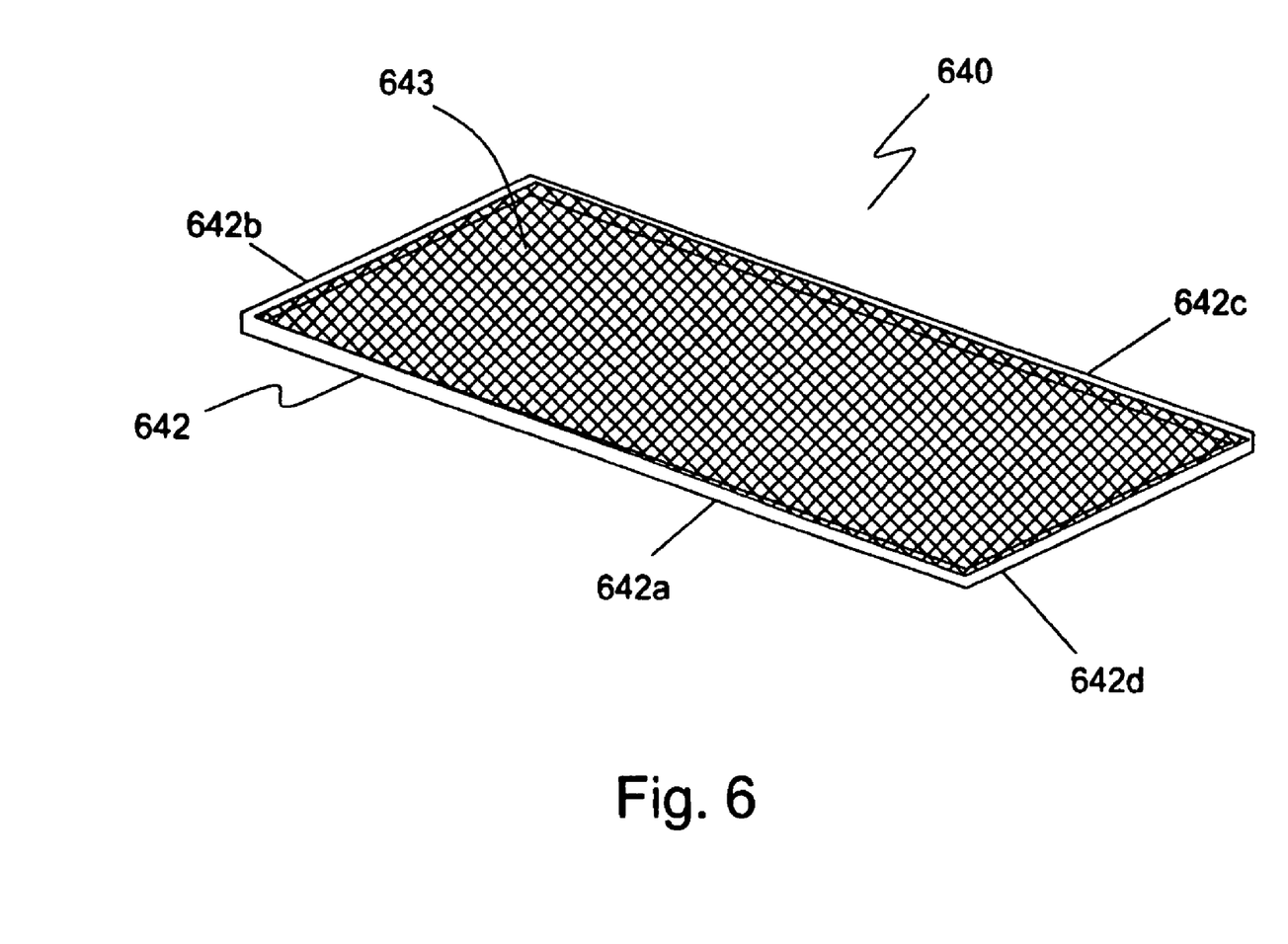
FIG. 6 is a perspective view of one embodiment of a wing structure made with Parylene C used in the present invention.

Turning now to FIG. 6, there is illustrated a wing 640 made with Parylene C. Wing 640 includes a wing frame 642 made of polysilicon beams 642a, 642b, 642c, 642d and a wing membrane 643. Wing membrane 643 is composed of a thin layer of Parylene C (approximately 100 nanometers thick) that is deposited through vaporization. Parylene C has many desirable features. It adheres well, it is durable at a small scale, and it is resistant to strong chemicals like HF and $HNO_3$.

The parylene deposited on the device driven by thermal actuators is only anchored along three of the four sides of the perimeter, allowing force measurements to be made for a flapping wing of elastic material with a trailing edge free to move in response to the flow, similar to a bat's wing. This design was included to provide insight into an alternate approach to generating lift.

Figure 7:
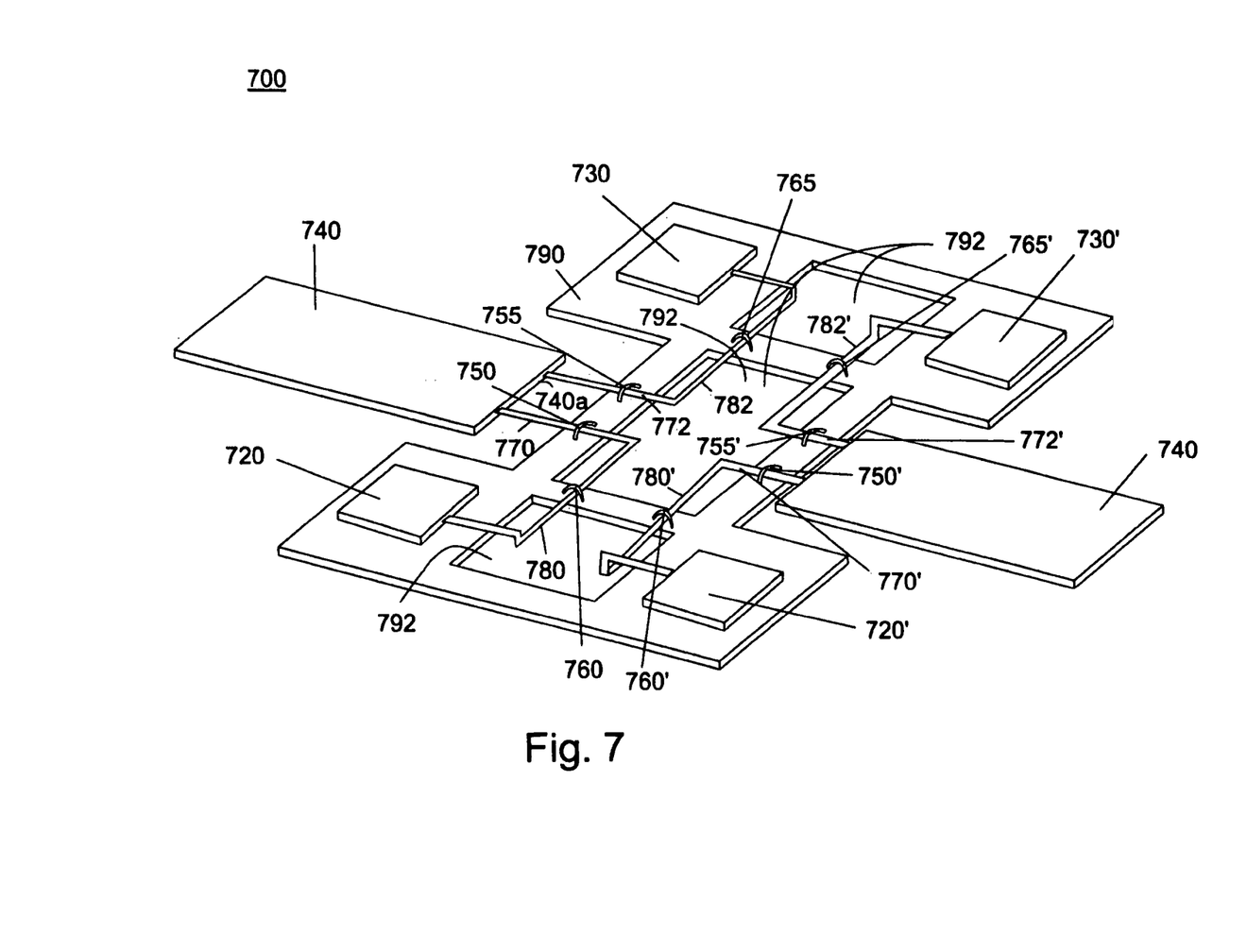
FIG. 7 is a perspective view of one embodiment of the present invention showing a μ-UAV using capacitive actuators.

Turning now to FIG. 7, there is illustrated a μ-UAV using capacitive actuators. μ-UAV 700 includes a leading actuator 720 and 720', a trailing actuator 730 and 730', a pair of wings 740, leading wing edge fulcrums 750 and 750', trailing wing edge fulcrums 755 and 755', leading wing beams 770 and 770', trailing wing beams 772 and 772', leading actuator beam fulcrums 760 and 760', trailing actuator beam fulcrums 765 and 765', leading actuator beams 780 and 780', trailing actuator beams 782 and 782', a substrate 790, and a power source (not shown). In order to attain the vertical displacement required, i.e. 50 to 100 microns, μ-UAV 700 includes through-wafer, backside anisotropic etches that create "pits" (as indicated by ref. no. 792) to give adequate clearance for the lever motion. This unique feature gives designers near complete freedom to define the displacement amplification ratio as needed, without being constrained by the clearance issues inherent with surface micromachining. Actuators 720, 720' and 730, 730' are capacitive actuators. Because actuators 720, 720' and 730, 730' are capacitive actuators, actuators 720, 720' and 730, 730' can actuate not only both wings 740 independently but also operate the respective leading and trailing wing independently.

Actuators 720, 720' and 730, 730' are each connected to their respective actuator beams 780, 782, 780', and 782' that are each connected to one of the wing beams 770, 772, 770', and 772', respectively. As previously disclosed, to obtain the desired wingtip displacement, the lever-fulcrum method is employed to amplify the vertical displacement of the actuators by an appropriate factor so as to generate the desired wingtip displacement of between about 50 and about 100 microns. Each wing 740 is connected to wing beams 770, 772 and 770', 772', each wing beam 770, 772 and 770', 772' flanking the midpoint of the wing's end 740a. The distance from the midpoint is responsible for the amplification of the wing rotation that results from a difference in height between wing beams 770, 772 and 770', 772'. When activated, actuators 720, 720', 730, and 730' are allowed to snap down to a nitride layer covering substrate 790, forcing one end of actuator beams 780, 780', 782, and 782' downwards, hinging the beams about fulcrums 760, 760', 765, and 765', and raising the opposite ends out-of-plane.

The previous embodiments focused on the vertical flapping method for lift generation. There exists, however, in nature a more efficient method. Fruit flies, for example, employ a horizontal flapping method in which the wing is translated at an angle so as to deflect fluid downwards, then rotate about the wing's midpoint, and reverse direction until returning to the point of origin, again deflecting fluid downwards. In this way, there is no segment of the wing motion that produces negative lift. This horizontal flapping motion is much more efficient at producing lift than the vertical flapping method, which relies on the difference in the cross-sectional area exposed to the oncoming flow to produce less negative lift on the upstroke than positive lift on the downstroke.

Figure 8:
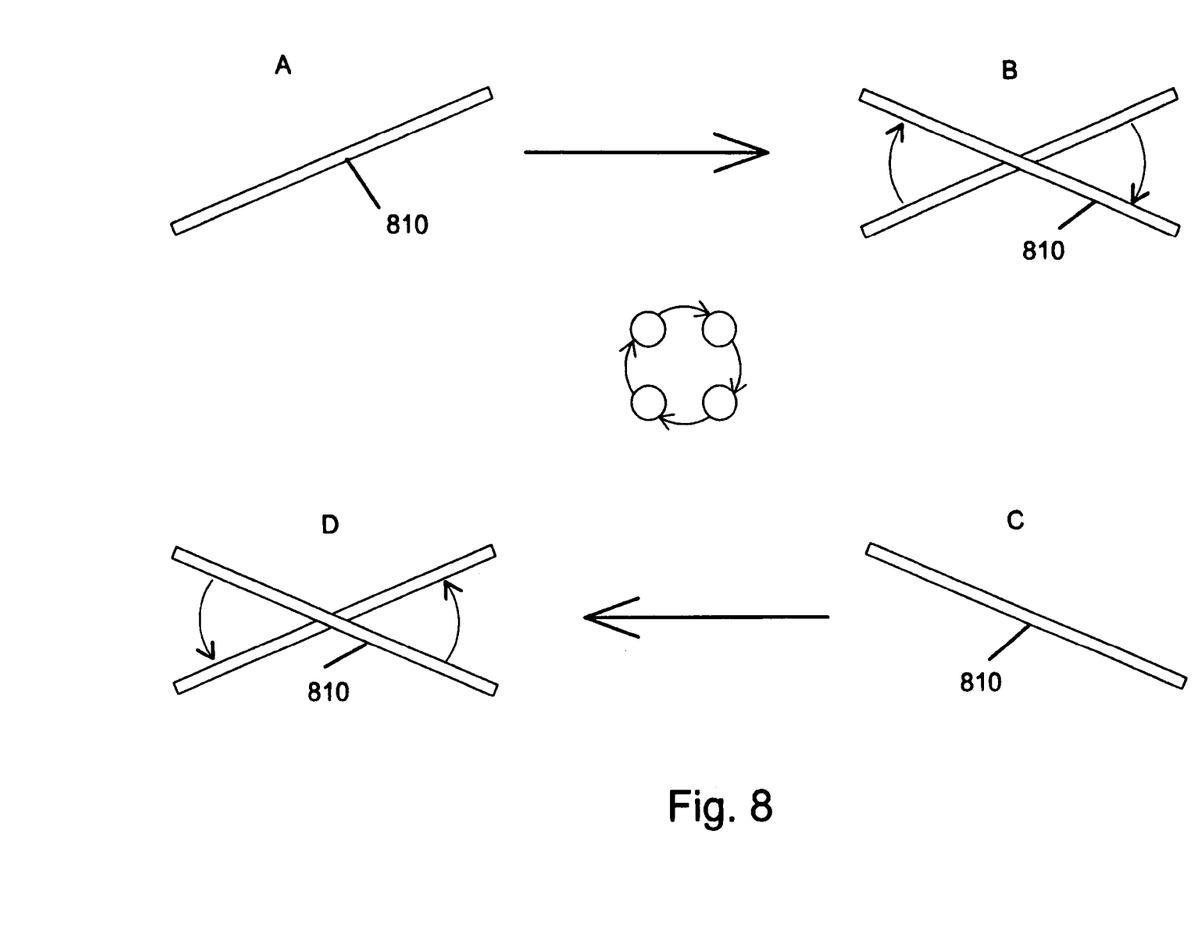
FIG. 8 is a conceptual representation of another embodiment of the present invention showing a horizontal flapping mechanism.

FIG. 8 is a conceptual representation of a horizontal flapping mechanism that includes both horizontal and rotational motion of a wing 810. As shown at step A, wing 810 is in a first pitch position. Wing 810 translates forward a predetermined distance caused by actuator activation. Wing 810 moves about a midpoint through a pitch rotation that is clockwise at step B. Wing 810 translates backward at step C the same predetermined distance it moved in the forward direction at step A. At step D, wing 810 pitches about the midpoint through a pitch rotation that is counterclockwise and is then set to repeat the steps.

The horizontal drive mechanism requires both horizontal and rotational motion of the wings. By using wing beams that are spaced vertically instead of horizontally (as in the vertical flapping embodiment), the combination of motion should be capable of being generated. In other words, if two actuators were designed to actuate against two points, one directly above the other, then the required motion can be achieved.

Figure 9:
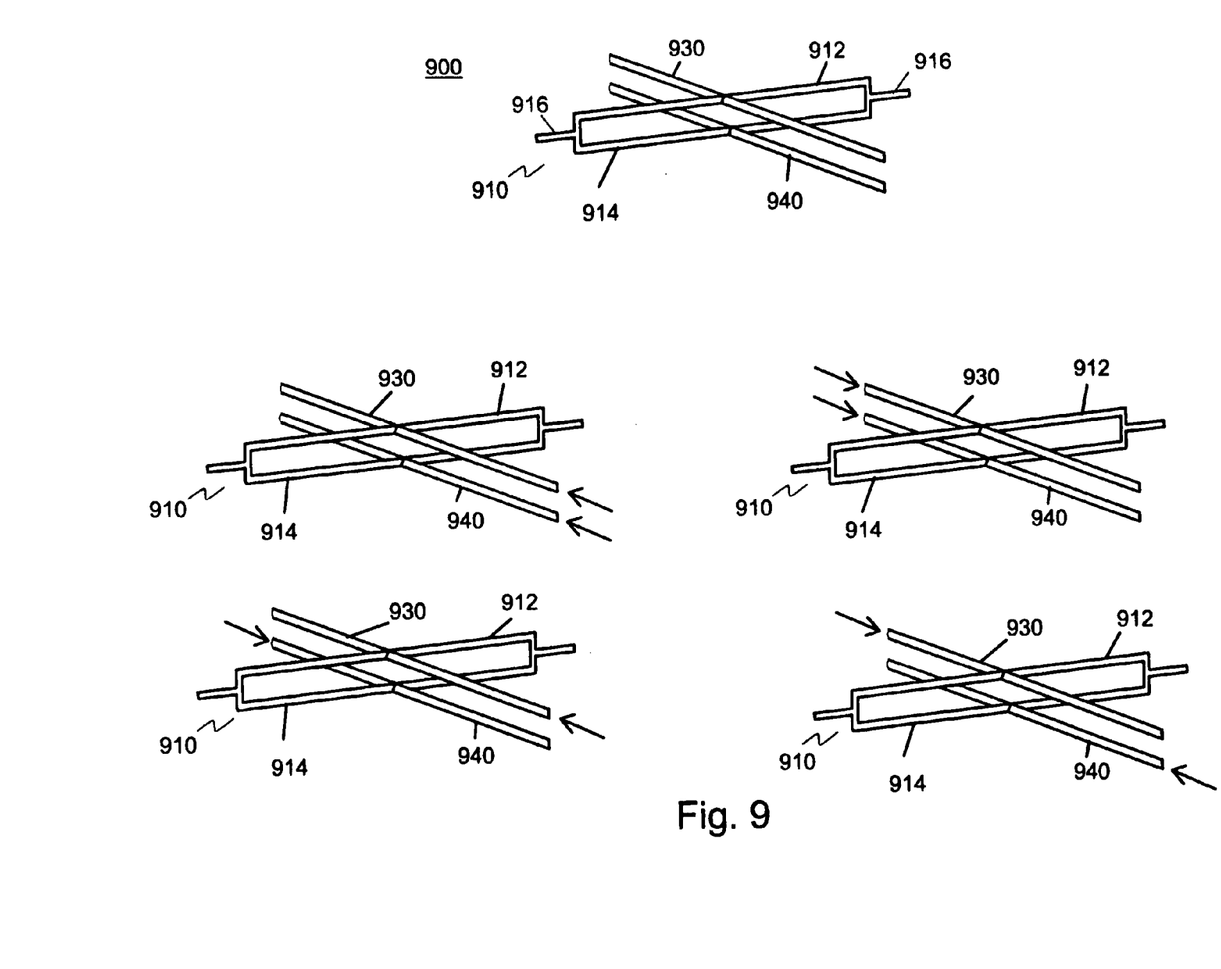
FIG. 9 is a perspective view of the horizontal flapping mechanism of the present invention.

FIG. 9 illustrates another embodiment of the present invention incorporating such a horizontal flapping mechanism 900. Horizontal flapping mechanism 900 includes a wing spar 910, a top actuator beam 930 and a bottom actuator beam 940. Wing spar 910 has a top wing spar 912 and a bottom wing spar 914 that are vertically stacked. Top wing spar 912 and bottom wing spar 914 are joined at each end into a wing beam 916. Wing beam 916 provides rotational movement for the required pitch change to the wings. Top actuator beam 930 and bottom actuator beam 940 provide the forward and rearward wing sweep motion.

By activating both actuators simultaneously causing top actuator beam 930 and bottom actuator beam 940 to move in the same direction, the wings would sweep forwards or backwards, depending on whether the front or rear actuators are activated. Similarly, by activating only the top actuator on one side of the wing spars while activating the bottom actuator on the opposite side, then the wings would rotate either clockwise or counterclockwise, depending on the combination of actuators used.

The μ-UAV can be fabricated using either the SUMMiT V™ or the SwIFT processes or other micro-fabrication techniques, with only minor design modifications. The design can be configured to be thermally actuated and suspended by fixed-fixed cantilever interconnects, or electrostatically actuated and suspended by free-ended cantilever interconnects. Wings can be made of polysilicon or parylene C or other materials common to semi-conductor or plastics micro-fabrication. It is important to note the features of the μ-UAV of the present invention. The μ-UAV of the present invention (1) incorporates a means for the wings to both translate and rotate using two-dimensional linear displacement without the use of a complex transmission system (reducing the likelihood of breakdown and increasing overall efficiency), (2) is much smaller than any known micro-aerodynamic device, (3) is designed for maximum versatility and ease of experimentation, (4) fully incorporates a means to quantitatively and directly measure generated lift forces, (5) is batch-fabricated and does not require post-processing assembly, and (6) uses a two-lever system to amplify out-of-plane displacement.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

We claim:

1. A method of making a micro-unmanned vehicle comprising:
   using Micro-Electro-Mechanical Systems technology; and forming on a substrate at least a pair of wings with leading wing beams and trailing wing beams, at least two actuators, a leading actuator beam pivotably coupled to said leading wing beams, a trailing actuator beam pivotably coupled to said trailing wing beams, a vehicle body having a plurality of fulcrums pivotally securing said leading wing beams, said trailing wing beams, said leading actuator beam and said trailing actuator beam and having at least one anisotropically etched recess to accommodate a lever-fulcrum motion of said coupled beams, and a power source.

2. The method of claim 1 further comprising separating said micro-unmanned aerodynamic vehicle from said polysilicon substrate.

3. The method of claim 1 wherein said forming step further includes forming said power source into a power source selected from the group consisting of radio frequency signals, solar energy, chemical energy, vibration energy, and photovoltaic cells.

4. The method of claim 1 wherein said step of forming said at least two actuators includes forming thermal actuators.

5. The method of claim 1 wherein said step of forming said at least two actuators includes forming electrostatic plate actuators.

6. The method of claim 1 wherein said step of forming said at least one pair of wings includes forming a wing frame and disposing a layer of Parylene C onto said wing frame.

7. The method of claim 1 wherein said step of forming includes forming said at least one pair of wings out of solid polysilicon.

8. The method of claim 1 wherein said step of forming includes forming said at least one pair of wings to produce lift with a vertical flapping movement.

9. The method of claim 1 wherein said step of forming includes forming said at least one pair of wings to produce lift with a horizontal flapping movement.

10. The method of claim 1 wherein said step of forming includes forming said recess sufficiently deep to provide a vertical wingtip displacement of about 50 microns or more.

11. The method of claim 1 wherein said step of forming includes forming said leading actuator beam to said leading wing beam and said trailing actuator beam to said trailing wing beam to have a ratio sufficient to provide relative to said lever-fulcrum motion a vertical wingtip displacement of about 50 microns or more.

12. The method of claim 1 wherein said step of forming includes forming a third actuator connected to a second leading actuator beam wherein said first leading actuator beam is coupled to one of said at least a pair of wings and said second leading actuator beam is coupled to the other of said at least a pair of wings.

13. The method of claim 1 wherein said step of forming a fourth actuator connected to a second trailing actuator beam wherein said first trailing actuator beam is coupled to one of said at least a pair of wings and said second trailing actuator beam is coupled to the other of said at least a pair of wings.

14. The method of claim 1 wherein said step of forming includes configuring said plurality of fulcrums to provide pivoting action where the lever-fulcrum motion produces out-of-plane displacement amplification of said at least a pair of wings.

* * * * *